Aug. 13, 1935.  R. C. BRADLEY  2,011,393
HOSE DELIVERY SYSTEM AND NOZZLE THEREFOR
Filed Dec. 7, 1933  2 Sheets-Sheet 1
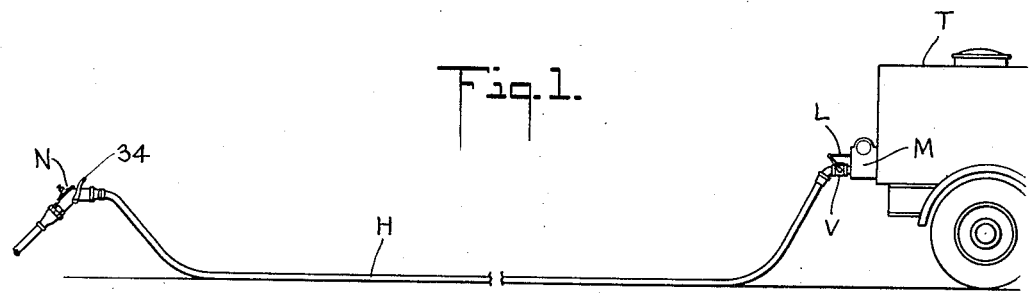
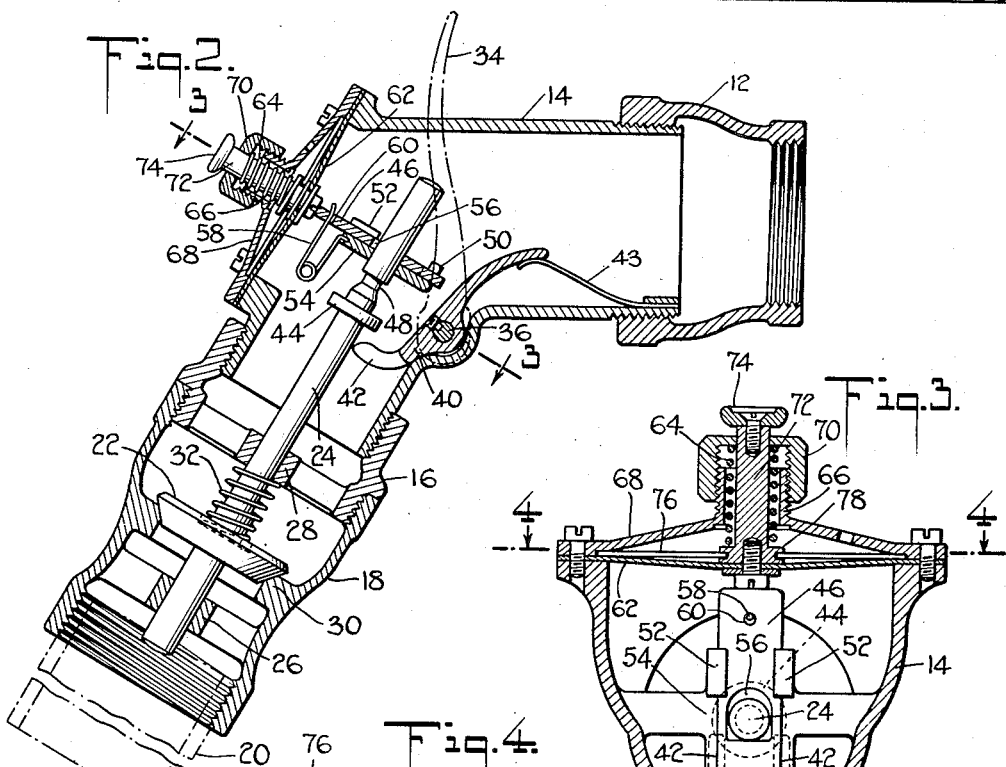
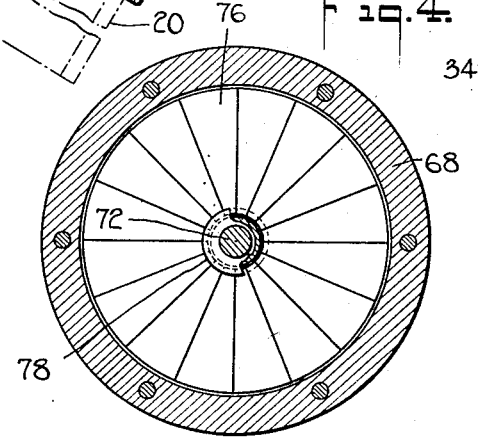
INVENTOR
Richard C. Bradley
BY
*James & Franklin*
ATTORNEYS Aug. 13, 1935.  R. C. BRADLEY  2,011,393
HOSE DELIVERY SYSTEM AND NOZZLE THEREFOR
Filed Dec. 7, 1933  2 Sheets-Sheet 2
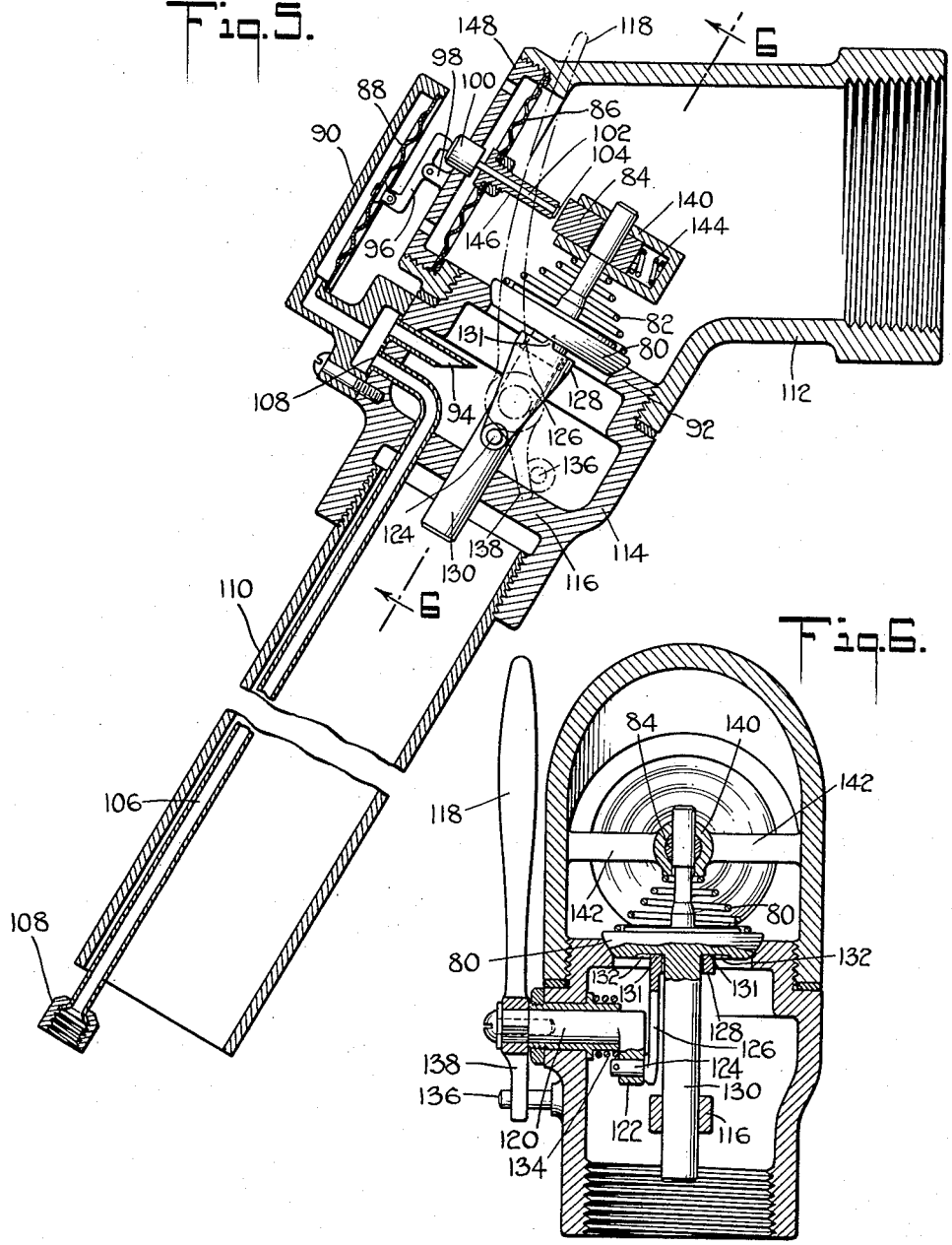
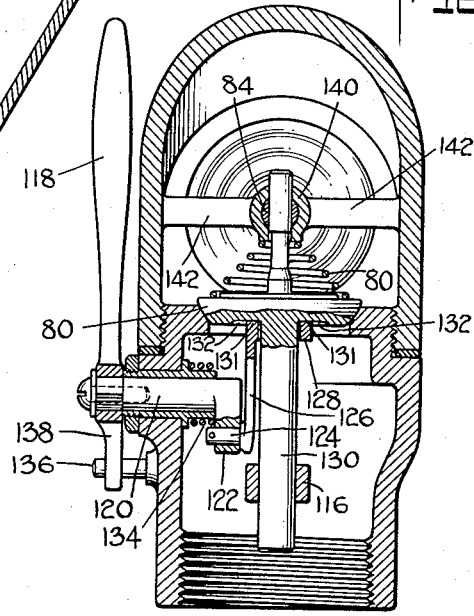
INVENTOR
Richard C. Bradley
BY
ATTORNEYS Patented Aug. 13, 1935

2,011,393

UNITED STATES PATENT OFFICE 2,011,393

HOSE DELIVERY SYSTEM AND NOZZLE THEREFOR

Richard C. Bradley, Brooklyn, N. Y., assignor of one-half to Fred J. Bradley, St. Albans, N. Y.

Application December 7, 1933, Serial No. 701,264

22 Claims. (Cl. 221—101)

This invention relates to an automatically controlled valve mechanism, especially such valve mechanism embodied in a delivery nozzle, and more particularly to a complete hose delivery system utilizing such a nozzle.

The primary object of my invention is to generally improve hose delivery systems such as are commonly employed for delivering fluids, for example liquid fuel oil, gasoline, or the like, from tank trucks, with a view to minimizing the amount of labor and attention needed for delivery; to insure accurate quantitative delivery; and to dispense with the necessity of emptying the hose at each delivery.

A more particular object of my invention resides in the provision of a nozzle having a valve automatically responsive to a change in pressure applied thereto, particularly a reduction in pressure caused by cessation of flow of liquid under pressure through the valve. The delivery truck is ordinarily provided with a meter and a valve at the truck, so that the operator may shut the truck valve when the meter indicates the desired delivery. Often the meter is provided with automatic means to trip the truck valve. In either case, my invention results in immediate and automatic tripping of the nozzle valve at the far end of the hose, which may be from 60 to 300 feet away. The hose is kept full or "wet" between deliveries, and each delivery is accurately gauged, being independent of errors heretofore caused by variations in the quantity of liquid left in the hose. Furthermore, the time and labor heretofore attendant upon attempted emptying of the long hose at the end of each delivery are saved.

A further object of my invention resides in the provision of means making possible instantaneous closing of the nozzle valve under manual control.

Still further objects of my invention center about the optional provision in combination with the aforesaid means of additional means for automatically closing the nozzle valve when the tank receiving the liquid becomes full. This feature is desirable to prevent overflow should the customer mistakenly ask for an excessive delivery, and to take care of purchasers requesting that the tank be filled without specifying a definite quantity to be delivered. More particularly, it is an object of my invention to provide means responsive to suction produced by flow of liquid through the nozzle for closing the valve, and further means for making the suction means ineffective until the tank is filled to a desired level. The suction is preferably relieved through a slender feeler tube extending through the delivery nozzle and terminating at the desired liquid level. When liquid reaches the end of the feeler tube, the vent or relief of suction therethrough is terminated, thus making the suction effective to close the valve.

To the accomplishment of the foregoing and such other objects as will hereinafter appear, my invention consists in the automatically controlled nozzle valve, the hose delivery system, and the various elements thereof, as hereinafter are more particularly described in the specification and sought to be defined in the claims. The specification is accompanied by drawings in which:

Fig. 1 is a side elevation showing the hose delivery system;

Fig. 2 is a section taken in elevation through a nozzle and valve system embodying some features of my invention;

Fig. 3 is a transverse section taken in the plane of the line 3—3 in Fig. 2;

Fig. 4 is a section taken in the plane of the line 4—4 of Fig. 3;

Fig. 5 is a section taken in elevation through a nozzle and valve system of different form embodying additional features of my invention; and Fig. 6 is a section taken in the plane of the line 6—6 in Fig. 5.

Referring to the drawings and more particularly to Fig. 1 thereof, the invention is shown applied to a hose delivery system for delivering fuel, say, gasoline, or fuel oil for house heating systems, from a tank truck T to an appropriate tank through a delivery nozzle N at the end of a delivery hose H. The fuel may be measured by an appropriate meter M and its flow under pressure controlled by an appropriate valve V at the truck, which valve may be of the butterfly type. Because the tank receiving the fuel may be located a considerable distance from the road, the hose H is ordinarily at least 60 feet long and is sometimes as much as 300 feet in length. It is ordinarily of the metal-reinforced type which does not flatten when rolled up. Due to the length of hose and to the fact that the home and tank may be on elevated ground, it is customary to pump the fluid from the tank truck T under pressure, say, 30 pounds per square inch, by means of a pump, not shown. The truck valve V may be shut manually when the meter reaches a desired reading, or, more preferably and as here illustrated, the meter M is connected to valve V by appropriate linkage L providing an automatic trip and closing of valve V when meter M reaches a predetermined reading. This mechanism may be of conventional type including a backward running counter which is preliminarily set to the desired reading and which trips the valve when the reading reaches zero; and the said mechanism therefore need not be described in detail. Suitable arrangements are shown in my copending applications Ser. No. 677,248, filed June 23, 1933, and Ser. No. 699,120, filed Nov. 22, 1933; but any conventional mechanism for this purpose may be used.

In accordance with one important object of my invention, the nozzle N is provided with valve mechanism which is automatically shut when the truck valve V is closed. This mechanism is described with reference to Figs. 2, 3 and 4 of the drawings.

The complete nozzle body is made up of parts 12, 14, 16, 18 and 20, the part 12 forming a coupling between the hose and the part 14; the parts 16 and 18 forming a downwardly sloping extension of part 14 and serving to house an axially reciprocable disc valve 22; and the part 20 being simply a downwardly sloping discharge pipe or extension which may be some 2½ feet in length. Discharge pipe 20 is readily inserted downwardly into the stand pipe of the tank which ordinarily is 3 feet or more in length. Valve 22 is carried by and movable with an axial valve stem 24 carried in a guide or bearing 26 cast integrally with the part 18, and another guide or bearing 28 cast integrally with the part 16. Part 18 is, of course, also provided with a valve seat 30 against which valve 22 may be seated by resilient means, specifically a compression spring 32 tensioned between the guide 28 and the valve disc 22.

The valve may be moved upwardly from the closed position shown to open position, by means of a manually operable handle 34. Handle 34 is mounted outside the nozzle body on a spindle 36, packed against leakage at 38 (Fig. 3), which in turn carries a lever 40 the lower end of which is bifurcated to form fingers 42 which are dimensioned to straddle valve rod 24 and to bear against a collar 44, and the upper end of which is urged upwardly by a leaf spring 43. The valve mechanism further includes a detent 46 cooperating with annular grove 48 on the valve stem for holding the valve in open position against the action of spring 32. Detent 46 consists of a plate slidable in end and side guides 50 and 52 formed on a stationary support 54 extending transversely across and cast integrally with the part 14 of nozzle body, as is best shown in Fig. 3. Detent 46 is apertured or slotted at 56 to receive the valve stem 24, and is normally urged to locking position by a spring 58 anchored at one end on stationary support 54 and bearing at its other end in a hole 60 in detent plate 46. The tendency of the arms of spring 58 to spread apart causes the detent to bear against the lower side of the valve stem and to lock the valve in elevated position.

The nozzle is further provided with means responsive to decrease of pressure in the nozzle body for releasing detent 46 and thereby closing the valve. For this purpose, the nozzle is provided with a diaphragm 62, preferably forming a part of the wall of the nozzle body and preferably disposed immediately adjacent detent 46. This diaphragm is normally urged outwardly by the pressure of the liquid flowing through the nozzle, but when this pressure is relieved, the diaphragm moves inwardly and, bearing against the end of detent plate 46, releases the valve stem. The inward movement of the diaphragm may, if desired, be caused by a compression spring 64 housed in a threaded bushing 66 forming an integral part of protective plate 68 which caps the diaphragm. The tension of compression spring 64 may be adjusted by a nut 70 screwed on threaded bushing 66, thus making possible adjustment of the pressure at which the valve will be released, or, in other words, the sensitivity of response to a change in pressure.

To make possible manual tripping of the valve to closed position, a pin 72, secured to the diaphragm, is preferably projected outwardly through nut 70 and provided with a button-like head 74. It will be evident that by pressing button 74, the diaphragm and detent will be moved inwardly and the valve released.

The diaphragm 62 may be made in various ways, that here shown being made of an imperforate lamination of leather 62 stiffened by an assemblage of wedge-like sheet metal members 76 which, as is best shown in Fig. 4, integrate to form a circle. The outer ends of these members are carried between diaphragm 62 and cover plate 68, while the inner ends of the members are carried in a grooved collar 78 formed on the diaphragm pin 72. It will be manifest that because of the subdivision of the metallic stiffening circle into a great number of slender circular wedges, the circle is rendered flexible and does not impede axial movement of diaphragm pin 72. However, the flexible leather diaphragm 62 is stiffened against the possibility of movement or bellying independently of the diaphragm pin 72.

Another form of my invention is shown in Figs. 5 and 6, this form differing from that heretofore described primarily in the provision of means to automatically trip and close the valve when the liquid in the tank being supplied reaches a desired predetermined level. The present form of the invention, like that already described, includes an axially reciprocable valve disc 80 normally biased to closed position by a compression spring 82, but retained in open position by a detent 84. To release the detent and thereby trip the valve, I provide, in addition to the first or pressure diaphragm 86, a second or suction diaphragm 88. One side of diaphragm 88 is closed by a diaphragm chamber 90 which communicates with means for producing suction as a result of the flow of liquid through the nozzle. This suction may be developed by Venturi action, or by taking advantage of the valve seat 92 as a constriction, or, as here illustrated, by the use of a Pitot tube 94 projecting into the flow stream. Movement of diaphragm 88 inwardly of diaphragm chamber 90 is transferred, through lever 96 pivoted at 98, to button 100 formed at the outer end of a pin 102 the inner end 104 of which is thereupon pressed against detent 84, thus releasing valve 80.

The suction means for closing the valve is normally made ineffective and becomes effective only when the liquid reaches a desired level. With this purpose in view, the diaphragm chamber 90 is ordinarily opened or vented through a slender feeler tube 106 communicating with the diaphragm chamber at 108 and passing downwardly through the nozzle discharge pipe 110. Feeler tube 106 is terminated by a coupling 108 located a little below the end of discharge pipe 110. It will be evident that when the liquid in the tank reaches the end of feeler tube 106, the free or venting relief of suction in the diaphragm chamber 90 is terminated, the feeler tube being sealed by the liquid which is drawn partially upwardly therein. Suction diaphragm 88 is thereupon drawn inwardly and the valve released.

It will be understood that because nozzle discharge pipe 110 is ordinarily made some 3 feet in length, the feeler tube 108 approximately determines the full level of the tank and in any case trips the valve before possibility of overflow from the stand pipe of the tank. Coupling 108 is provided in order to make possible the ready attachment of additional lengths of feeler tube, so that the level at which the valve will be closed may be varied as desired. An important advantage of the present system is that it makes possible control through curved or bent stand pipes because the extensions of feeler tube 106 are relatively slender and may be bent as necessary in order to finally reach into the tank.

The present nozzle differs in several minor respects from that heretofore described, aside from the additional valve control; and these differences will be briefly referred to. The nozzle body is made of only two parts, numbered 112 and 114, the part 114 carrying the valve guide 116 and the valve seat 92, as well as the control handle 118. The control handle is mounted on the outer end of a spindle 120 the inner end of which is formed into a small crank 122. This receives the pin 124 of a connecting arm 126 the upper end of which is provided with a ring 128 loosely surrounding the valve stem 130. Ring 128 is provided with a pair of upstanding fulcrum points 131 which bear against the bottom of valve disc 80 and which are preferably seated in mating grooves or recesses 132. Handle 118 is normally restored to the position shown in the drawings by a torsion spring 134 which moves the handle until stopped by a stop 136 bearing against its lower end 138. It will be evident that when the handle 118 is swung downwardly, the crank 122 lifts the valve 80 upwardly through the medium of connecting arm 126.

The upper end of valve stem 130 is carried in a generally cylindrical housing 140 cast integrally with the nozzle body 112 through arms or webs 142 (see Fig. 6). Housing 140 carries transversely reciprocable detent member 84 which in the present case is cylindrical rather than flat in cross-section. The detent is normally urged outwardly by a small compression spring 144 carried in housing 140 at the end of detent 84, as is best shown in Fig. 5.

Pressure diaphragm 86 is made of annularly corrugated spring metal, rather than leather reinforced with metallic strips. The diaphragm is anchored and sealed at its center to a tubular finger 146, and is anchored and sealed at its outer rim to the nozzle body by a sealing plate 148. It should be noted that the push-pin 102 for suction diaphragm 88 is movable independently of push finger 146 for the pressure diaphragm. This is important because otherwise suction diaphragm 88 would have to be made sufficiently large in area to overcome not only the resistance of detents 84, but also the resistance of pressure diaphragm 86.

It will be noted that the formation of pin 102 into an enlarged head or button 100 at its outer end makes it possible to trip or close the valve manually by simply pressing button 100 inwardly.

It is believed that the mode of constructing and using my invention, as well as the many advantages thereof, will be apparent from the foregoing detailed description thereof. The delivery system is improved, dispensing with the necessity for several attendants and the time and labor needed for attempted emptying of the hose, as well as errors caused by incomplete emptying of the same. Control of the truck valve at the meter or by the meter automatically controls the nozzle valve at the far end of the hose, no interconnecting mechanism other than the hose itself being needed. The nozzle valve is opened manually and may, if desired, be closed manually. It may further be tripped to closed position when the tank receiving the liquid is filled to a desired level. Both valve control means are independent of one another, so that the valve may be closed if the tank becomes filled before the requested delivery has been completed, thus preventing flooding and loss of fuel, and, conversely, so that the valve may be tripped when the predetermined delivery is completed even if the tank has not yet been filled. The suction trip mechanism for determining when the tank is filled is convenient because ordinarily it requires no attention, and is further convenient because its feeler tube may be passed through curved or bent piping should that become necessary.

It will be understood that while I have shown a diaphragm responsive to changes in pressure, it is also possible to use a movable piston or like member instead of a diaphragm. It will further be apparent that while I have shown both the suction and pressure stops in the second form of nozzle, it is possible to construct the nozzle with the suction stop alone. It will further be appreciated that the automatic valve control mechanism may, if desired, be used for controlling a valve not necessarily located in a discharge nozzle, the valve being instead located at an intermediate point in a pipe system.

It will therefore be apparent that while I have shown and described my invention in preferred forms, many changes and modifications may be made in the structures disclosed, without departing from the spirit of the invention, defined in the following claims.

I claim:

1. In combination, a relatively long flexible hose, and a discharge nozzle at the free or delivery end thereof, said nozzle embodying a valve, resilient means tending to close said valve, detent means for holding the valve in open position, and means for releasing the detent means and thereby effecting closing of the valve in response to a reduction of pressure in the nozzle, said last means including a sealed diaphragm exposed on one side only to the valve chamber.

2. In combination, a relatively long flexible hose, and a discharge nozzle at the free or delivery end thereof, said valve chamber, a valve seat in said chamber, a valve movable toward and away from said seat and normally biased toward said seat, means to lock the valve in open position, and means responsive to a reduction of pressure in said valve chamber for releasing said lock means, said last means including a sealed diaphragm exposed on one side only to the valve chamber.

3. In combination, a relatively long flexible hose, and a discharge nozzle at the free or delivery end thereof, said valve comprising a valve body, a valve element movable therein, resilient means normally urging said valve element to closed position, detent means for holding the same open, and means responsive to a reduction of pressure in the valve body for automatically tripping the detent means and closing the valve, said last means including a sealed diaphragm exposed on one side only to the valve chamber.

4. In combination, a valve chamber, a valve therein, means movable in response to a decrease in pressure applied thereto for effecting closing said valve, and means to produce a decrease in pressure as a result of liquid flow through said valve, said movable valve closing means being responsive to decrease in pressure whether obtained from flow or from stoppage of flow.

5. A hose delivery system comprising, in combination, a first valve, a relatively long flexible hose pipe connected thereto, a second valve at the discharge end of said pipe, means for closing the first valve, and means responsive to the resulting reduction in pressure in the second valve for automatically closing the second valve.

6. A valve for controlling the flow of liquid into a tank, said valve comprising a valve body, a movable valve element therein, means responsive to a reduction in pressure in the valve body for automatically closing the valve, and means responsive to the liquid in the tank reaching a desired level for also automatically closing the valve.

7. A hose nozzle comprising a nozzle body, a valve therein, resilient means normally urging said valve to closed position, manually operable means for opening said valve, detent means for holding the same open, and means responsive to a reduction of pressure in the nozzle body for automatically tripping the detent means and closing the valve, said last means including a sealed diaphragm exposed on one side only to the valve chamber.

8. A hose delivery system comprising a first valve, a relatively long flexible hose, a nozzle at the discharge end of the hose, said nozzle including a second valve, means for closing the first valve, and means responsive to the resulting reduction in pressure in the nozzle for automatically closing the nozzle valve.

9. A hose delivery system comprising a meter, a first valve, a relatively long flexible hose, a nozzle at the discharge end of the hose, said nozzle including a second valve, means automatically operated by the meter for closing the first valve, and means responsive to the resulting reduction in pressure at the nozzle for automatically closing the second valve.

10. A hose nozzle comprising a nozzle body, a valve therein movable between open and closed positions, resilient means normally closing the valve, detent means to hold the same open, and means to release the detent and close the valve in response to a reduction of pressure in the nozzle, said means including a diaphragm forming a part of the nozzle body and urged outwardly by pressure therein, and means connecting the diaphragm and the detent.

11. A hose nozzle comprising a nozzle body, a valve therein movable between open and closed positions, resilient means normally closing the valve, manually operable means to open the valve, detent means to hold the same open, and means to release the detent and close the valve in response to a reduction of pressure in the nozzle, said means including a diaphragm forming a part of the nozzle body and urged outwardly by pressure therein, resilient means urging the diaphragm inwardly, means connecting the diaphragm and the detent, and trip means projecting from the nozzle body for manually releasing the detent.

12. A hose nozzle for filling a tank, said nozzle comprising a nozzle body, a valve therein movable between open and closed positions, and means to automatically close the valve when the liquid reaches a desired level in the tank, said means including a feeler tube extending through the nozzle, means at the end of said feeler tube for coupling an extension thereto for extending into the tank to the desired level, and mechanism responsive to the presence of liquid in said tube for closing the valve.

13. A hose nozzle for filling a tank, said nozzle comprising a nozzle body, a valve therein movable between open and closed positions, resilient means normally tending to close the valve, detent means to hold the same open, and means to automatically release the detent and close the valve when the liquid reaches a desired level in the tank, said means including a diaphragm enclosed on one side by a diaphragm chamber, a feeler tube extending from said chamber through the nozzle, means at the end of said feeler tube for coupling an extension thereto for extending into the tank to the desired level, means for producing a suction in response to flow of fluid through the nozzle, and means for communicating said suction to the diaphragm chamber.

14. A hose nozzle for filling a tank, said nozzle comprising a nozzle body, a valve therein movable between open and closed positions, resilient means normally tending to close the valve, manually operable means to open the valve, detent means to hold the same open, and means to automatically release the detent and close the valve when the liquid reaches a desired level in the tank, said means including a diaphragm enclosed on one side by a diaphragm chamber, a feeler tube extending from said chamber through the nozzle and into the tank to the desired level, and a Pitot tube projecting into the nozzle also communicating with the diaphragm chamber.

15. A hose nozzle for filling a tank, said nozzle comprising a nozzle body, a valve therein, resilient means normally closing the valve, detent means to hold the same open, means responsive to a reduction in pressure in the nozzle to release the detent and close the valve, and means responsive to the liquid in the tank reaching a desired level for also releasing the detent and closing the valve.

16. A hose delivery system for filling a tank, comprising a first valve, a hose connected to said valve, a nozzle including a second valve at the discharge end of the hose, means for closing the first valve, means responsive to the resulting reduction in pressure at the nozzle for automatically closing the second valve, and means responsive to the liquid in the tank reaching a desired level for independently closing the second valve.

17. A hose delivery system for filling a tank, comprising a meter, a first valve, a hose, a nozzle including a second valve, means automatically operated by the meter for closing the first valve, means responsive to the resulting reduction in pressure at the nozzle for automatically closing the second valve, and means responsive to the liquid in the tank reaching a desired level for independently closing the second valve.

18. A hose nozzle for filling a tank, said nozzle comprising a nozzle body, a valve therein movable between open and closed positions, means to close the valve in response to a reduction of pressure in the nozzle, said means including a diaphragm urged outwardly by pressure in the nozzle body, and independent means to automatically close the valve when the liquid reaches a desired level in the tank, said independent means including a feeler tube extending through the nozzle and into the tank to the desired level, and mechanism responsive to the presence of liquid in said tube for closing the valve.

19. A hose nozzle for filling a tank, said nozzle comprising a nozzle body, a valve therein movable between open and closed positions, resilient means normally tending to close the valve, detent means to hold the same open, means to release the detent and close the valve in response to a reduction of pressure in the nozzle, said means including a diaphragm forming a part of the nozzle body and urged outwardly by pressure therein, means for applying inward movement of the diaphragm to the detent, and independent means to automatically release the detent and close the valve when the liquid reaches a desired level in the tank, said independent means including a diaphragm enclosed on one side by a diaphragm chamber, a feeler tube extending from said chamber through the nozzle and into the tank to the desired level, means for producing suction in response to the flow of liquid through the nozzle body, means for communicating said suction to the diaphragm chamber, and means for applying to the detent movement of the diaphragm into the chamber.

20. A hose nozzle for filling a tank, said nozzle comprising a nozzle body, a valve therein movable between open and closed positions, resilient means normally tending to close the valve, manually operable means to open the valve, detent means to hold the same open, means to release the detent and close the valve in response to a reduction of pressure in the nozzle, said means including a diaphragm forming a part of the nozzle body and urged outwardly by pressure therein, resilient means urging the diaphragm inwardly, means for applying inward movement of the diaphragm to the detent, and independent means to automatically release the detent and close the valve when the liquid reaches a desired level in the tank, said independent means including a diaphragm enclosed on one side by a diaphragm chamber, a feeler tube extending from said chamber through the nozzle and into the tank to the desired level, a Pitot tube projecting into the nozzle body and also communicating with the diaphragm chamber, and means for applying to the detent movement of the diaphragm into the chamber.

21. A hose nozzle for filling a tank, said nozzle comprising a nozzle body including a valve seat and a downwardly sloping relatively elongated discharge pipe, a valve axially movable within the nozzle body between open and closed positions, means for normally closing the valve, a detent for holding the valve in open position, a first diaphragm mounted on the nozzle body, means between the diaphragm and the detent for releasing the same upon inward movement of the diaphragm, a diaphragm chamber and a second diaphragm secured to said nozzle body, means between said second diaphragm and the detent for applying inward movement of the diaphragm to release the detent, means communicating with the diaphragm chamber for producing suction in response to flow through the nozzle, and a feeler tube communicating with the diaphragm chamber and extending downwardly through the nozzle pipe to a point corresponding to the desired level in the tank.

22. A hose nozzle for filling a tank, said nozzle comprising a nozzle body including a valve seat and a downwardly sloping relatively elongated discharge pipe, a disc valve axially movable within the nozzle body between open and closed positions, a compression spring for normally closing the valve, a transversely movable detent for holding the valve in open position, a first diaphragm mounted on the outer wall of the nozzle body adjacent the detent, resilient means urging the diaphragm inwardly, a finger projecting from the diaphragm to the detent for releasing the same upon inward movement of the diaphragm, a diaphragm chamber and a second diaphragm secured to said nozzle body, means connected to said second diaphragm and movable independently of the first diaphragm for applying inward movement thereof to release the detent, a Pitot tube communicating with the diaphragm chamber and projecting into the nozzle, and a feeler tube communicating with the diaphragm chamber and extending downwardly through the nozzle discharge pipe to a point corresponding to the desired level in the tank.

RICHARD C. BRADLEY.